United States Patent
Gardes et al.

(10) Patent No.: US 10,830,089 B2
(45) Date of Patent: Nov. 10, 2020

(54) TURBOFAN COMPRISING A SERIES OF ROTATABLE BLADES FOR BLOCKING OFF THE BYPASS FLOW DUCT

(71) Applicant: Airbus Operations SAS, Toulouse (FR)

(72) Inventors: Pascal Gardes, Levignac (FR); Frédéric Ridray, L'isle Jourdain (FR); Frédéric Piard, Tournefeuille (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 16/281,593

(22) Filed: Feb. 21, 2019

(65) Prior Publication Data

US 2019/0284952 A1 Sep. 19, 2019

(30) Foreign Application Priority Data

Mar. 13, 2018 (FR) .................................... 18 52166

(51) Int. Cl.
*F01D 17/16* (2006.01)
*F02K 1/72* (2006.01)

(52) U.S. Cl.
CPC .............. *F01D 17/167* (2013.01); *F02K 1/72* (2013.01); *F05D 2220/323* (2013.01); *F05D 2240/128* (2013.01); *F05D 2250/411* (2013.01); *F05D 2260/53* (2013.01)

(58) Field of Classification Search
CPC ....................................................... F02K 1/72
See application file for complete search history.

(56) References Cited

U.S. PATENT DOCUMENTS

| | | | | |
|---|---|---|---|---|
| 2,933,890 | A | * 4/1960 | Morrison | F02K 1/625 239/265.31 |
| 3,036,431 | A | * 5/1962 | Vdolek | F02K 1/72 60/229 |
| 3,503,211 | A | * 3/1970 | Holman | F02K 1/72 60/229 |

(Continued)

FOREIGN PATENT DOCUMENTS

| | | |
|---|---|---|
| DE | 1937679 A1 | 2/1971 |
| DE | 102013225045 A1 | 6/2015 |
| WO | WO-0031401 A1 * 6/2000 | ............... F02K 1/72 |

OTHER PUBLICATIONS

French Search Report; priority document.

*Primary Examiner* — Woody A Lee, Jr
(74) *Attorney, Agent, or Firm* — Greer, Burns & Crain, Ltd.

(57) ABSTRACT

A turbofan with a fan casing and a nacelle which comprises a fixed structure, a movable assembly with a movable cowl and a slide, which is translationally movable between an advanced position and a retreated position in which the movable cowl is moved away from the fan casing in order to define a window open between a duct and the outside of the nacelle, a plurality of blades, each being mounted rotatably on the slide, where each blade is movable between a retracted position in which the blade is outside of the duct and a deployed position in which the blade is across the duct, a set of actuators for moving the slide and an operating system configured to move each blade from the retracted position to the deployed position, and vice versa.

5 Claims, 4 Drawing Sheets

(56) References Cited

U.S. PATENT DOCUMENTS

| | | | | |
|---|---|---|---|---|
| 3,612,402 A * | 10/1971 | Timms | ............... | B64C 9/38 |
| | | | | 239/265.29 |
| 4,005,822 A * | 2/1977 | Timms | ............ | B64C 25/423 |
| | | | | 239/265.31 |
| 5,402,963 A * | 4/1995 | Carey | ............... | F02C 3/064 |
| | | | | 181/215 |
| 2015/0308379 A1* | 10/2015 | James | ............... | F02K 1/72 |
| | | | | 60/226.2 |
| 2015/0354499 A1* | 12/2015 | Caruel | ............... | F02K 1/30 |
| | | | | 239/265.19 |
| 2016/0108852 A1* | 4/2016 | Caruel | ............ | F16H 25/2204 |
| | | | | 239/265.19 |
| 2017/0328304 A1* | 11/2017 | Gormley | ............ | F02K 1/763 |
| 2018/0065754 A1* | 3/2018 | Sawyers-Abbott | ....... | F02K 1/56 |
| 2018/0230941 A1* | 8/2018 | Gutierrez | ............ | F02K 1/72 |
| 2019/0055900 A1* | 2/2019 | Wadsworth | ............ | F02K 1/72 |

* cited by examiner

TURBOFAN COMPRISING A SERIES OF ROTATABLE BLADES FOR BLOCKING OFF THE BYPASS FLOW DUCT

CROSS-REFERENCES TO RELATED APPLICATIONS

This application claims the benefit of the French patent application No. 1852166 filed on Mar. 13, 2018, the entire disclosures of which are incorporated herein by way of reference.

FIELD OF THE INVENTION

The present invention relates to a turbofan which comprises a series of blades which are mounted rotatably to block off the bypass flow duct, and to an aircraft comprising at least one such turbofan.

BACKGROUND OF THE INVENTION

An aircraft comprises a fuselage, on each side of which there is fastened a wing. Below each wing there is suspended at least one turbofan. Each turbofan is fastened below the wing by means of a pylon which is fastened between the structure of the wing and the structure of the turbofan.

The turbofan comprises an engine and a nacelle which is fastened around the engine. The turbofan has, between the nacelle and the engine, a bypass duct in which a bypass flow circulates.

The nacelle comprises a plurality of reverser doors, each being rotatable on the structure of the nacelle between a retracted position in which the door is outside of the secondary duct and a deployed position in which it is positioned across the secondary duct in order to divert the bypass flow towards a window which is in the wall of the nacelle and which is open between the bypass duct and the outside of the nacelle.

Thus, the bypass flow is diverted towards the outside and more precisely towards the front of the turbofan in order to produce a counter-thrust.

Although current reverser doors provide complete satisfaction, it is desirable to find different mechanisms, in particular, less heavy mechanisms.

SUMMARY OF THE INVENTION

One object of the present invention is to propose a turbofan which comprises a series of blades which are mounted rotatably to block off the bypass flow duct.

Accordingly, a turbofan is proposed having a longitudinal axis and comprising an engine and a nacelle surrounding the engine which comprises a fan casing, where a duct of a bypass flow is delimited between the nacelle and the engine and in which an air flow circulates in a flow direction, the nacelle comprising:

- a fixed structure fastened to the fan casing,
- a movable assembly having a movable cowl and a slide, the movable cowl being fastened to the slide downstream thereof with respect to the flow direction, the slide being translationally movable on the fixed structure in a direction of translation between an advanced position in which the slide is positioned in such a way that the movable cowl is moved towards the fan casing and a retreated position in which the slide is positioned in such a way that the movable cowl is moved away from the fan casing in order to define between them a window open between the duct and the outside of the nacelle,
- a plurality of blades, each comprising a first end mounted rotatably on the slide about an axis of rotation globally parallel to the longitudinal axis, where each blade is movable between a retracted position in which the blade is outside of the duct and a deployed position in which the blade is across the duct,
- a set of actuators for moving the slide between the advanced position and the retreated position, and vice versa, and
- an operating system intended to move each blade from the retracted position to the deployed position, and vice versa.

Such a turbofan allows a weight reduction by replacing the reverser doors and their drive mechanisms with lighter pivoting blades.

Advantageously, the set of blades comprises a first stage, which is furthest downstream with respect to the flow direction, where the blades are positioned in one and the same plane perpendicular to the longitudinal axis, the ones following the others over the periphery of the slide, and, on the following stage, upstream with respect to the preceding stage in the flow direction, the blades are positioned in another plane perpendicular to the longitudinal axis and are angularly offset about the longitudinal axis with respect to the blades of the preceding stage, and so on.

According to one particular embodiment, the nacelle comprises a cage having an outer wall concentric with the longitudinal axis and constituting the wall oriented towards the outside of the nacelle, for each stage of blades, the cage has a slot arranged between an upstream wall and a downstream wall, when they are in the retracted position, the blades of one and the same stage are housed in the slot associated with the stage, and, for each blade, a shaft secured to the blade is mounted rotatably at the first end between the upstream wall and the downstream wall of the stage corresponding to the blade and forms the axis of rotation of the blade.

According to one particular embodiment, the nacelle comprises a cage having an outer wall concentric with the longitudinal axis and constituting the wall oriented towards the outside of the nacelle, for each stage of blades, the cage has a slot arranged between an upstream wall and a downstream wall, when they are in the retracted position, the blades of one and the same stage are housed in the slot associated with the stage, for each blade, a shaft is mounted fixedly between the upstream wall and the downstream wall of the stage corresponding to the blade, and the blade is mounted rotatably about the shaft by a close fit at the first end.

Advantageously, for each blade, the outer wall has a window, the operating system comprises, for each blade, a pinion secured to the blade and concentric to the axis of rotation of the blade and of which the teeth protrude from the outer wall through the window, a rack mounted movably against the outer wall and having its teeth towards the outer wall in order to engage with the teeth of the pinions, and a motor intended to move the rack along the outer wall.

The invention also proposes an aircraft comprising at least one turbofan according to one of the preceding variants.

BRIEF DESCRIPTION OF THE DRAWINGS

The features of the invention which are mentioned above, and others, will become more clearly apparent on reading the following description of an exemplary embodiment, the description being given with reference to the appended drawings, in which.

DETAILED DESCRIPTION OF THE PREFERRED EMBODIMENTS

In the description which follows, the terms relating to a position are given with reference to the flow direction of the air in a turbofan, which thus flows from the front towards the rear of the aircraft.

Figure 1:
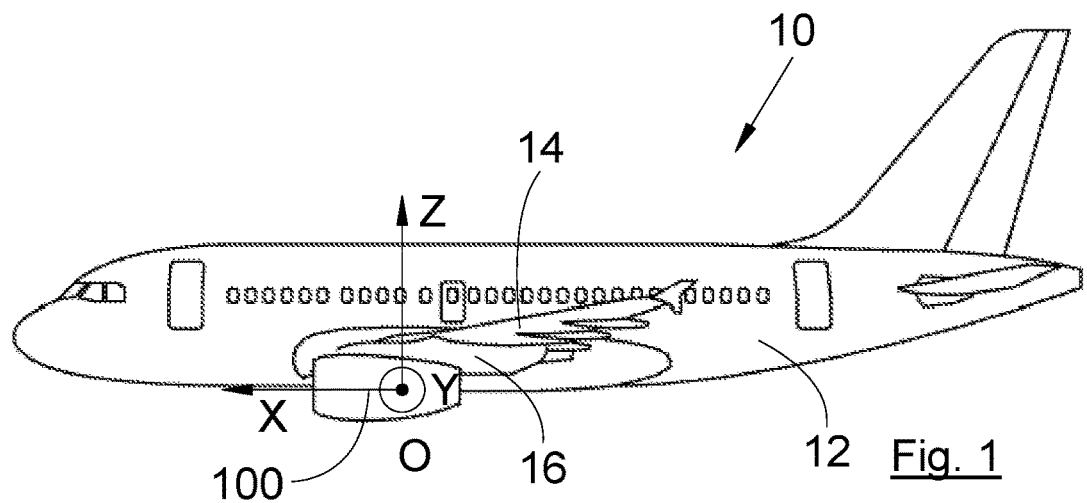
FIG. 1 is a side view of an aircraft comprising a turbofan according to the invention.

FIG. 1 shows an aircraft 10 which comprises a fuselage 12, on each side of which there is fastened a wing 14 which carries at least one turbofan 100 according to the invention. The fastening of the turbofan 100 below the wing 14 is achieved by means of a pylon 16.

Figure 2:
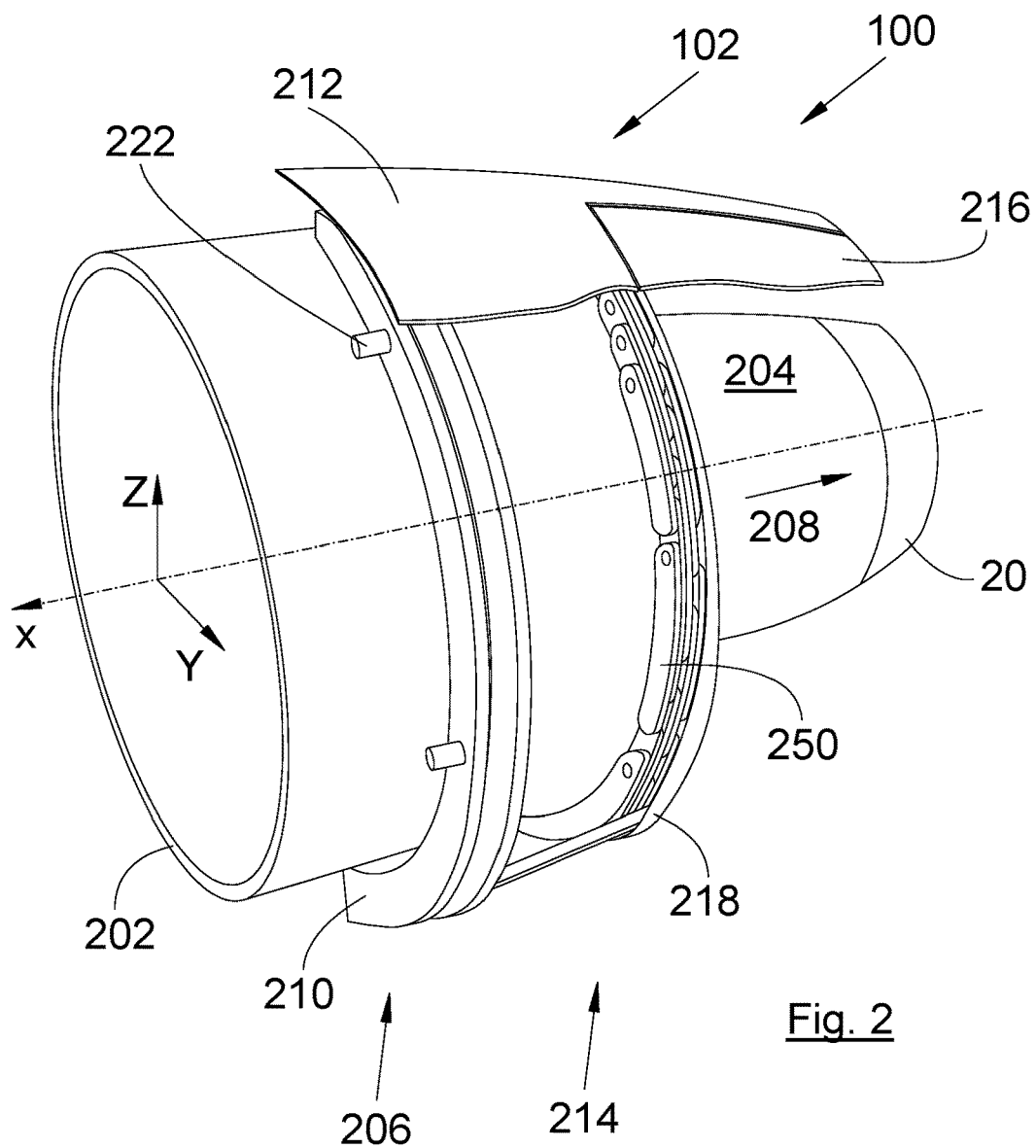
FIG. 2 is a perspective view of the turbofan according to the invention in the advanced and retracted position.

FIG. 2 shows the turbofan 100 which has a nacelle 102 and an engine 20 which is housed inside the nacelle 102 and which comprises a fan casing 202. The engine 20 is depicted in FIG. 2 by way of its rear ejection portion.

In the description which follows, and by convention, X denotes the longitudinal axis of the turbofan 100 which is parallel to the longitudinal axis of the aircraft 10 oriented positively towards the front of the aircraft 10, Y denotes the transverse axis which is horizontal when the aircraft is on the ground, and Z denotes the vertical axis, these three directions X, Y and Z being orthogonal to one another.

Figure 3:
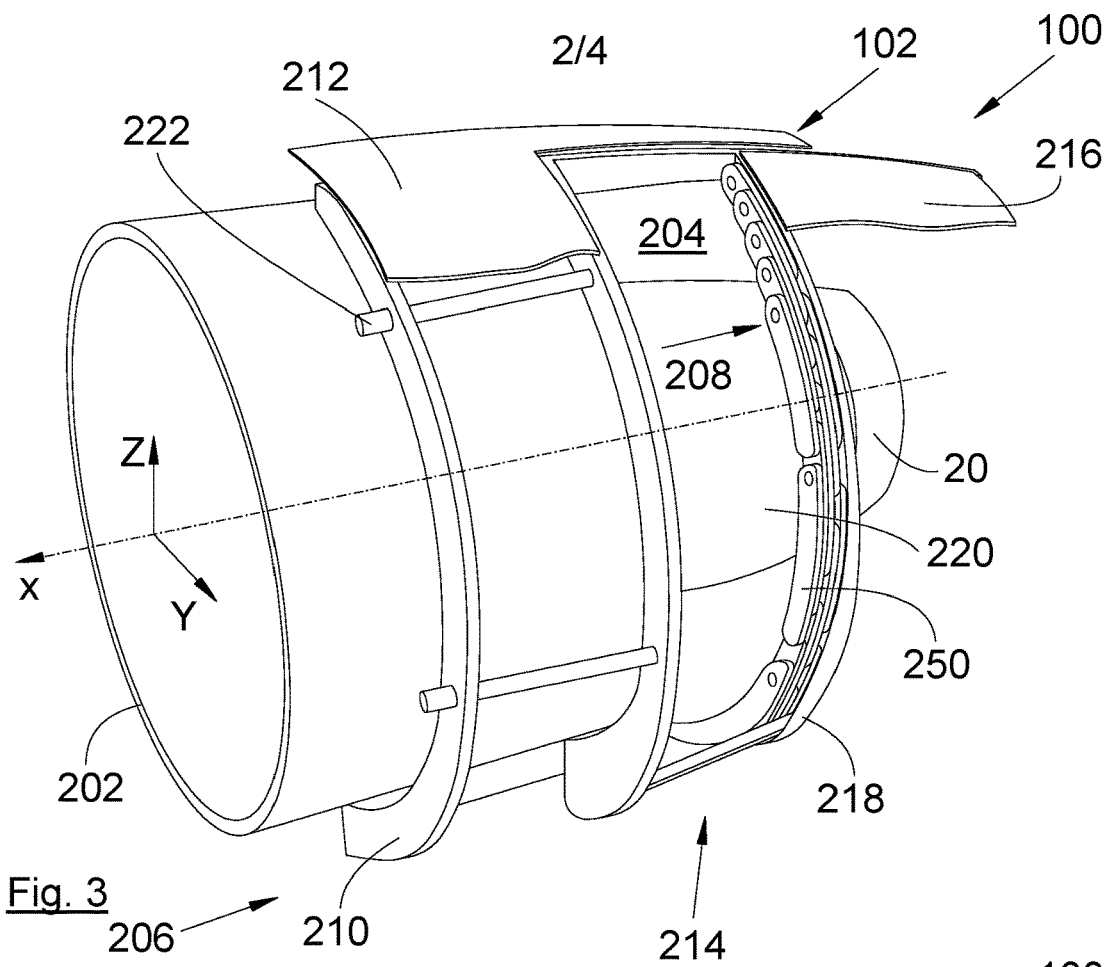
FIG. 3 is a perspective view of the turbofan according to the invention in the retreated and retracted position.
Figure 4:
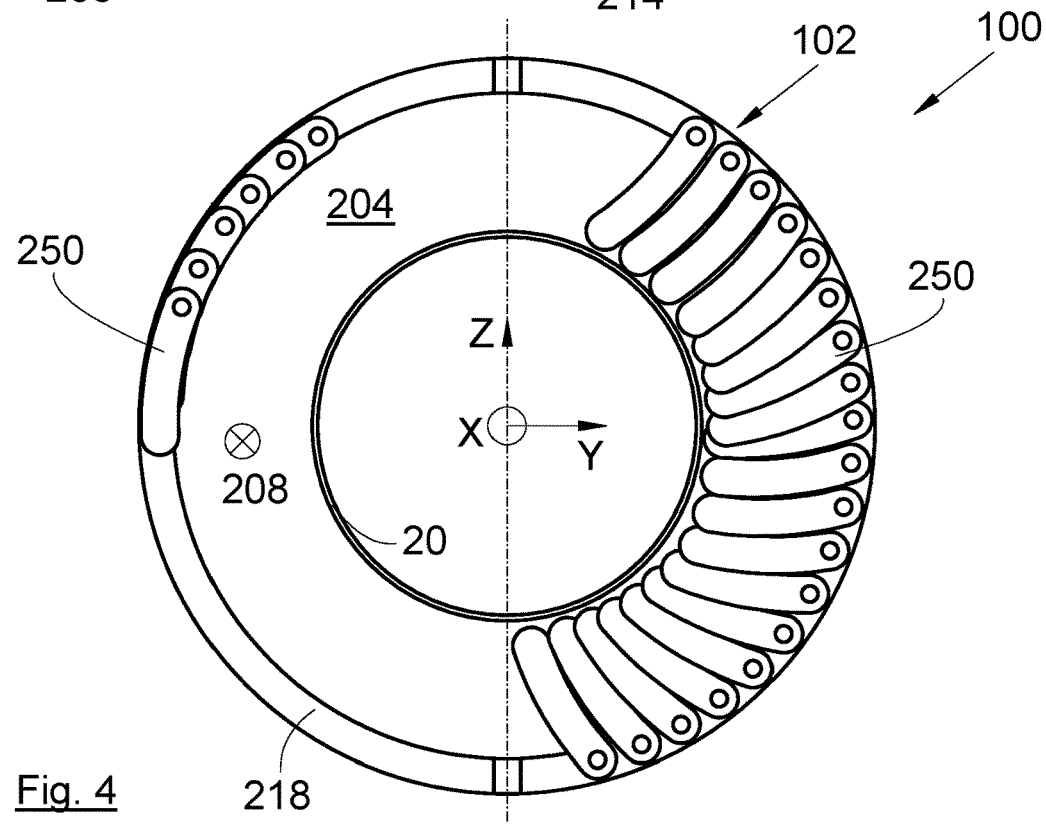
FIG. 4 is a front sectional view of the turbofan according to the invention taken along the plane IV of FIG. 3, in the retreated and deployed position on the right and in the retracted position on the left.
Figure 5:
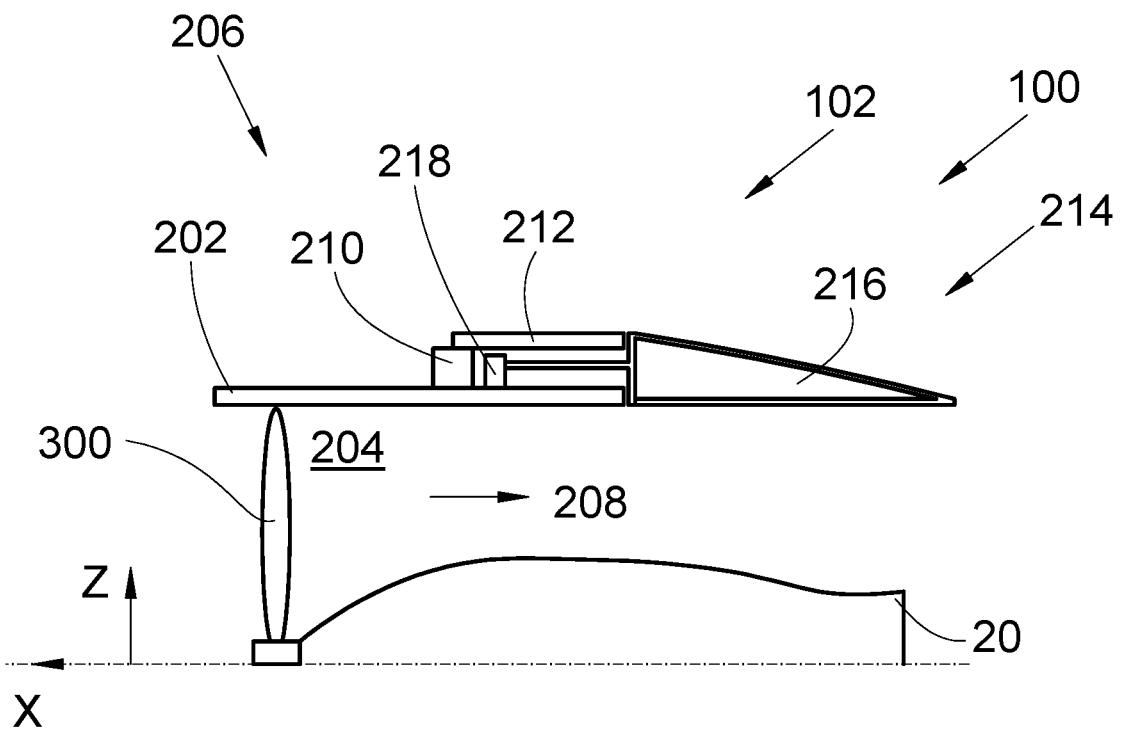
FIG. 5 is a schematic representation of a turbofan according to the invention seen in section through a vertical plane.

FIG. 3 and FIG. 4 show the turbofan 100 in various use positions, and FIG. 5 shows a schematic representation in section of the turbofan 100.

The turbofan 100 has, between the nacelle 102 and the engine 20, a duct 204 in which there circulates a bypass flow 208 which emanates from the air intake through a fan 300 and which therefore flows in the flow direction which runs from the front towards the rear.

The nacelle 102 has a fixed structure 206 which is mounted fixedly on the fan casing 202. The fixed structure 206 is composed, in particular, of a front frame 210 mounted around the fan casing 202 and of outer panels 212, of which a portion is cut away in FIGS. 2 and 3.

The nacelle 102 has a movable assembly 214 which has a movable cowl 216 (of which a cut-away portion is represented in FIG. 2) forming the walls of the nozzle, and a slide 218. The slide 218 here takes the form of a cylinder with apertured walls. The movable cowl 216 is fastened to the slide 218 downstream thereof with respect to the flow direction of the air flow in the turbofan 100.

The slide 218 is mounted so as to be translationally movable in a direction of translation globally parallel to the longitudinal axis X on the fixed structure 206 of the nacelle 102.

The slide 218 is movable between an advanced position (FIG. 2) and a retreated position (FIGS. 3 and 4), and vice versa. In the advanced position, the slide 218 is positioned as forward as possible with respect to the flow direction in such a way that the movable cowl 216 is moved towards the outer panels 212 and the fan casing 202. In the retreated position, the slide 218 is positioned as rearward as possible, with respect to the flow direction, in such a way that the movable cowl 216 is moved away from the outer panels 212 and the fan casing 202 so as to define a window 220 between them.

In the advanced position, the movable cowl 216 and the outer panels 212 prolong one another so as to define the outer surface of the nacelle 102, and the movable cowl 216 and the fan casing 202 prolong one another so as to define the outer surface of the duct 204.

In the retreated position, the movable cowl 216 and the fan casing 202 along with the outer panels 212 are at a distance and define between them a window 220 open between the duct 204 and the outside of the nacelle 102. That is to say, the air emanating from the bypass flow 208 passes through the window 220 to reach the outside of the turbofan 100.

The translation of the slide 218 is realized by any suitable means, such as, for example, slideway systems between the front frame 210 and the slide 218.

The nacelle 102 also comprises a set of actuators 222 for translationally moving the slide 218 between the advanced position and the retreated position, and vice versa. Each actuator 222 is controlled by a control unit, for example of the processor type, which controls the movements in one direction or in the other according to the requirements of the aircraft 10.

Each actuator 222 can, for example, take the form of a double-acting jack (two working directions) of which the cylinder is fastened to the front frame 210 and more generally to the fixed structure 206 of the nacelle 102, and a rod fastened to the slide 218.

In order to orient the air flow leaving the window 220, cascades can be fastened to the slide 218, facing the window 220.

The fan casing 202 and the outer panels 212 delimit the window 220 upstream with respect to the flow direction, and the movable cowl 216 delimits the window 220 downstream with respect to the flow direction.

The nacelle 102 comprises a plurality of blades 250, each being mounted rotatably on the slide 218 about an axis of rotation globally parallel to the longitudinal axis X. Each blade 250 is thus movable between a retracted position (FIGS. 2 and 3 and FIG. 4 on the left) in which the blade 250 is outside of the duct 204 and a deployed position (FIG. 4 on the right) in which the blade 250 is across the duct 204 in order to divert the bypass flow 208 towards the window 220.

Each blade 250 extends in a plane perpendicular to the longitudinal axis X.

Each blade 250 is mounted on the periphery of the slide 218. When the blades 250 are in the retracted position, they overlap one another along the longitudinal axis X, in groups, the ones above the others, so as to be aligned in a circular shape as represented in FIG. 4 on the left, where only some blades 250 have been represented.

In the embodiment of the invention, each blade 250 takes the form of a bean, but it is possible to conceive of different shapes.

The number of blades 250 and the shape of each of them depend on the dimensions of the turbofan 100 and on the width of each blade 250 in order that, in the deployed position, the blades 250 block off most of the duct 204.

Each blade 250 is mounted movably at a first end, whereas a second end moves towards the engine 20 when the blade 250 is deployed in order to optimally block off the duct 204.

Switching from the retracted position to the deployed position is achieved by rotating the blade 250 towards the inside of the turbofan 100.

The retracted position can be adopted when the slide 218 is in the advanced position or in the retreated position. The deployed position can be adopted only when the slide 218 is in the retreated position.

The slide 218 also bears an operating system which is intended to move each blade 250 from the retracted position to the deployed position, and vice versa. The operating system is controlled by the control unit. The operating system can be, for example, a motorized rack and pinion system, as described below, or any other suitable mechanical system.

The operation thus comprises, starting from the advanced/retracted position, activating the actuators 222 to move the slide 218 from the advanced position to the retreated position, then controlling the operating system in order to move the blades 250 from the retracted position to the deployed position.

Conversely, the operation thus comprises, starting from the retreated/deployed position, controlling the operating system in order to move the blades 250 from the deployed position to the retracted position, then activating the actuators 222 in order to move the slide 218 from the retreated position to the advanced position.

The use of blades 250 mounted rotatably on the slide 218 allows a lightening of the assembly with respect to the use of reverser doors of the prior art.

Figure 6:
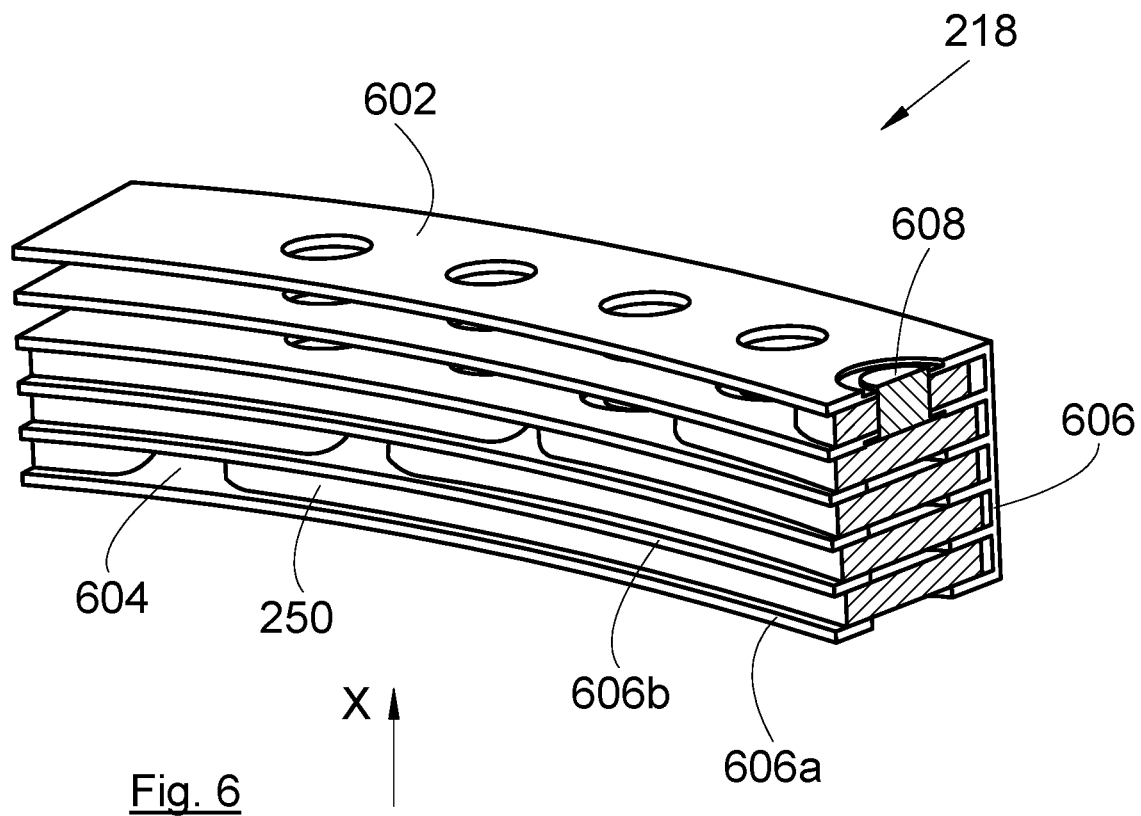
FIG. 6 is a perspective view of a detail of embodiment of the system for pivoting the blades.

FIG. 6 shows one particular embodiment of the pivot connections between the blades 250 and the slide 218.

As is represented in FIG. 2, the set of blades 250 comprises a first stage, which is furthest downstream with respect to the flow direction, where the blades 250 are positioned in the same radial plane XZ, that is to say, perpendicular to the longitudinal axis X, the ones following the others over the periphery of the slide 218. On the following stage, upstream with respect to the preceding stage in the flow direction, the blades 250 are positioned in another plane perpendicular to the longitudinal axis X, and are angularly offset about the longitudinal axis X with respect to the blades 250 of the preceding stage, and so on until the whole duct 204 is covered.

Of course, the number of stages can vary from one position to the other over the periphery of the slide 218 and the number of blades 250 per stage can also change from one stage to the other.

The angular offsetting makes it possible to offset the axes of rotation of the blades 250 with respect to one another, along the periphery of the slide 218.

The slide 218 comprises a cage 602 of which only a sector is represented in FIG. 6.

The cage 602 has an outer wall 606 which takes the form of a cylinder or of a portion of a cylinder according to the angular extent to be covered and which constitutes the wall oriented towards the outside of the nacelle 102.

The outer wall 606 is concentric with the longitudinal axis X.

For each stage of blades 250, the cage 602 has a slot 604 arranged between an upstream wall 606b and a downstream wall 606a and open towards the inside of the nacelle 102.

Each upstream wall 606b and each downstream wall 606a is in a plane perpendicular to the longitudinal axis X and forms a ring or a ring portion concentric with the longitudinal axis X.

When they are in the retracted position, the blades 250 of one and the same stage are housed in the slot 604 associated with the stage.

The pivot connection about which each blade 250 is mounted pivotably can take various forms.

According to one particular embodiment, for each blade 250, a shaft 608 secured to the blade 250 is mounted rotatably at the first end, between the upstream wall 606b and the downstream wall 606a of the stage corresponding to the blade 250, and forms the axis of rotation of the blade 250.

According to another embodiment, for each blade 250, a shaft 608 is mounted fixedly between the upstream wall 606b and the downstream wall 606a of the stage corresponding to the blade 250, and the blade 250 is mounted rotatably about the shaft 608 by a close fit at the first end. The shaft 608 forms the axis of rotation of the blade 250.

Figure 7:
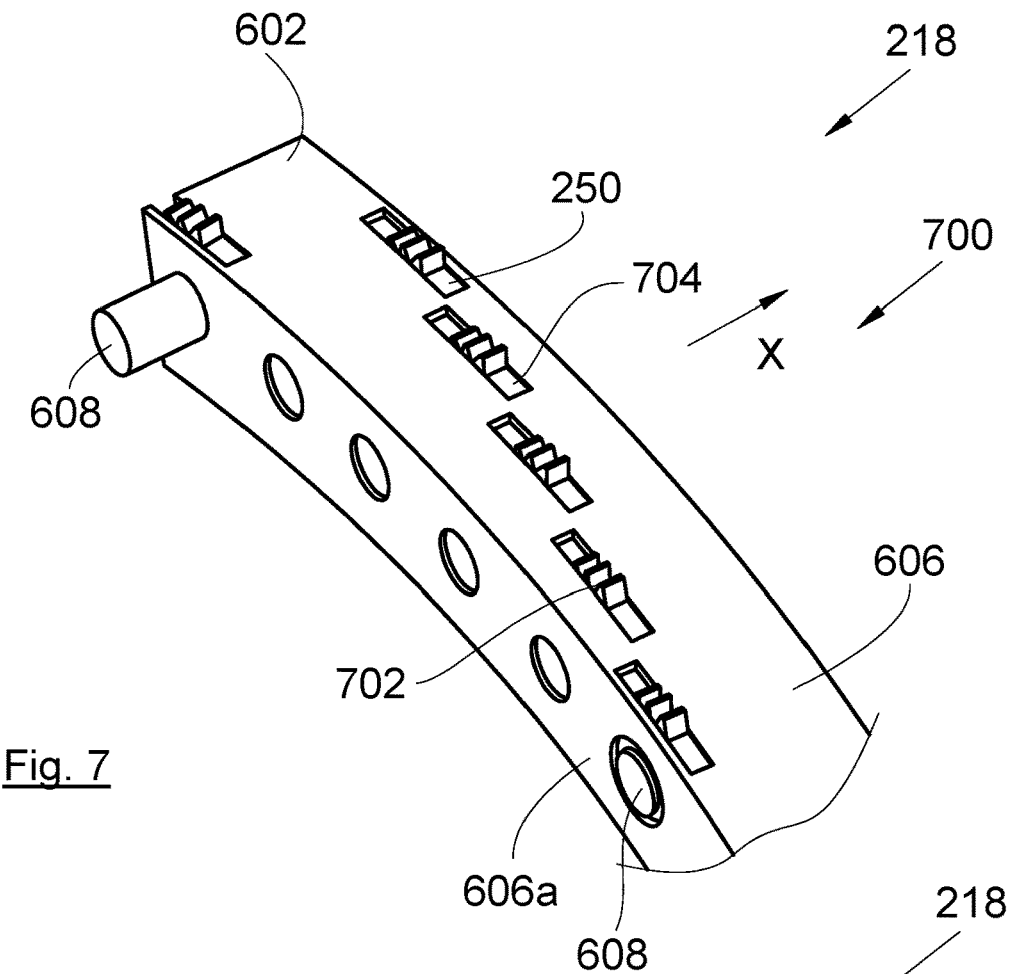
FIG. 7 and FIG. 8 show perspective views of a system for operating the blades according to one particular embodiment of the invention.
Figure 8:
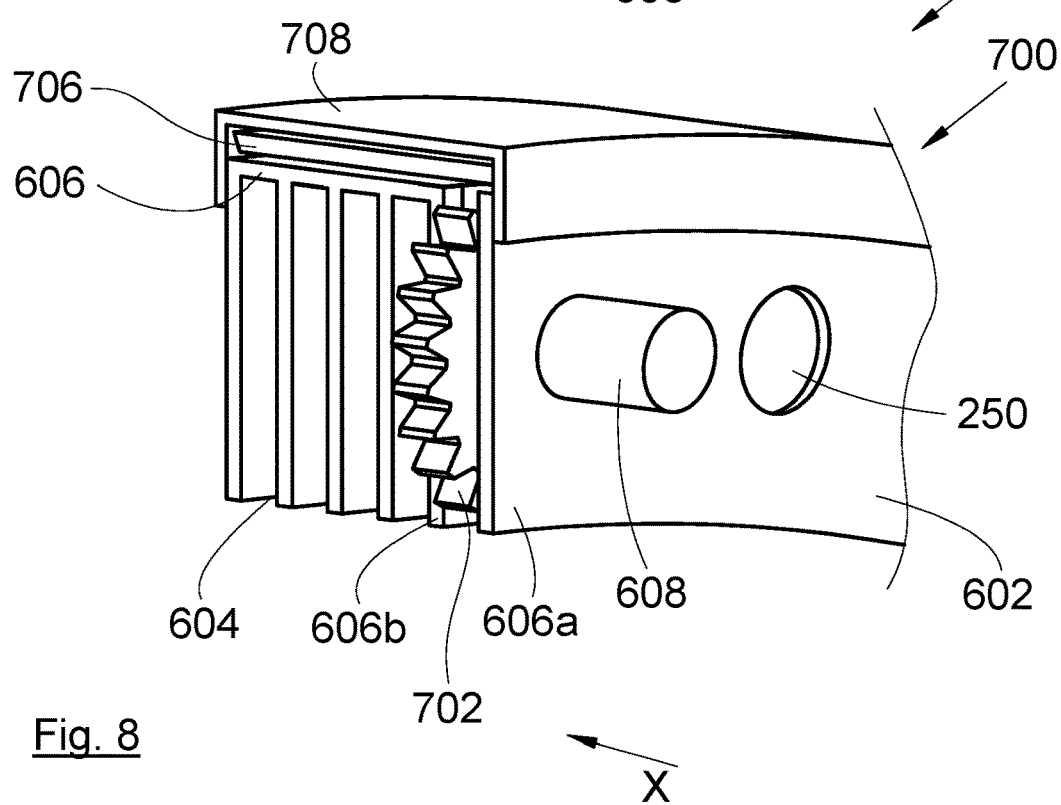

FIG. 7 and FIG. 8 show one particular embodiment of an operating system 700 employed with the cage 602.

Each blade 250 comprises, at its first end, a pinion 702 which is secured to the blade 250, which is concentric to the axis of rotation of the blade 250 and of which the teeth protrude beyond the outer wall 606 through a window 704 which the outer wall 606 has for this purpose.

A rack 706 is mounted movably against the outer wall 606 and has its teeth towards the outer wall 606 in order to engage with the teeth of the pinions 702.

In order to retain the rack 706, a cover 708 is mounted against the outer wall 606 in order to sandwich the rack 706 between the outer wall 606 and the cover 708.

The movement of the rack 706 is globally a rotation about the longitudinal axis X and the rack 706 globally takes the form of a cylinder concentric with the longitudinal axis X.

The operating system 700 thus comprises, for each blade 250, the pinion 702 and the rack 706.

In order to move the rack 706 along the outer wall 606, the operating system 700 also comprises a motor which is controlled by the control unit. The motor can engage directly with the teeth of the rack 706 via a pinion fastened to its motor shaft, or its motor shaft can constitute the shaft 608 of one of the blades 250.

Thus, according to the case, the rotation of the motor will drive the rack 706 either directly or via the shaft 608, thereby subsequently driving the rotation of the pinions 702, and hence the blades 250, in one direction or in the other.

The invention has been more particularly described in the case of a nacelle below a wing, but it can also be applied to a nacelle situated at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan having a longitudinal axis and comprising an engine and a nacelle surrounding the engine which comprises a fan casing, where a duct of a bypass flow is delimited between the nacelle and the engine and in which an air flow circulates in a flow direction, said nacelle comprising:
   a fixed structure fastened to the fan casing,
   a movable assembly having a movable cowl and a slide, the movable cowl being fastened to the slide downstream thereof with respect to the flow direction, the slide being translationally movable on the fixed structure in a direction of translation between an advanced position in which the slide is positioned in such a way that the movable cowl is moved towards the fan casing and a retreated position in which the slide is positioned in such a way that the movable cowl is moved away from the fan casing in order to define between them a window open between the duct and the outside of the nacelle,
   a plurality of blades, each blade comprising a first end mounted rotatably on the slide about an axis of rotation globally parallel to the longitudinal axis, where each blade is movable between a retracted position in which the blade is outside of the duct and a deployed position in which the blade is across the duct,
   a set of actuators for moving the slide between the advanced position and the retreated position, and vice versa, and
   an operating system configured to move each blade from the retracted position to the deployed position, and vice versa,
   wherein the plurality of blades are arranged in a plurality of stages along the flow direction, the plurality of stages comprising a first stage, which is furthest downstream with respect to the flow direction, where the blades of the first stage are positioned in one and the same plane perpendicular to the longitudinal axis, each one blade of the first stage following a next other blade of the first stage over a periphery of the slide, and
   wherein, for each one of the other stages than the first stage, the blades of each of the stage are positioned in a common plane different from the planes of other stages and perpendicular to the longitudinal axis and the blades are angularly offset about the longitudinal axis with respect to the blades of a stage which is arranged downstream with respect to the flow direction.

2. The turbofan according to claim 1, wherein the nacelle comprises a cage having an outer wall concentric with the longitudinal axis and constituting the wall oriented towards the outside of the nacelle, wherein, for each stage of blades, the cage has a slot arranged between an upstream wall and a downstream wall, wherein, when they are in the retracted position, the blades of a same stage are housed in the slot associated with the stage, and wherein, for each blade, a shaft secured to the blade is mounted rotatably at the first end between the upstream wall and the downstream wall of the stage corresponding to the blade and forms the axis of rotation of the blade.

3. The turbofan according to claim 2, wherein, for each blade of a stage, the outer wall has a window, wherein the operating system comprises, for each blade of a stage, a pinion secured to the blade and concentric to the axis of rotation of the blade and of which the teeth protrude from the outer wall through the window, a rack mounted movably against the outer wall and having its teeth towards the outer wall in order to engage with the teeth of the pinions, and a motor configured to move the rack along the outer wall.

4. The turbofan according to claim 1, wherein the nacelle comprises a cage having an outer wall concentric with the longitudinal axis and constituting the wall oriented towards the outside of the nacelle, wherein, for each stage of blades, the cage has a slot arranged between an upstream wall and a downstream wall, wherein, when they are in the retracted position, the blades of a same stage are housed in the slot associated with the stage, wherein, for each blade of the same stage, a shaft is mounted fixedly between the upstream wall and the downstream wall of the stage corresponding to the blade, and wherein the blade is mounted rotatably about the shaft by a close fit at the first end.

5. An aircraft comprising at least one turbofan according to claim 1.

* * * * *